(12) United States Patent
Bengtson et al.

(10) Patent No.: US 8,660,786 B2
(45) Date of Patent: Feb. 25, 2014

(54) POSITIONING MODULE

(75) Inventors: William T. Bengtson, McKinney, TX (US); Keith T. Hayata, McKinney, TX (US)

(73) Assignee: Raytheon Company, Waltham, MA (US)

( * ) Notice: Subject to any disclaimer, the term of this patent is extended or adjusted under 35 U.S.C. 154(b) by 91 days.

(21) Appl. No.: 13/211,657

(22) Filed: Aug. 17, 2011

(65) Prior Publication Data

US 2013/0046463 A1 Feb. 21, 2013

(51) Int. Cl.
*G01C 21/00* (2006.01)

(52) U.S. Cl.
USPC ............. 701/216; 701/207; 702/14; 704/9; 707/770; 600/141; 600/595; 310/334; 340/573.1; 341/20; 355/67; 358/1.12; 382/103

(58) Field of Classification Search
USPC ............. 701/207; 702/14; 704/9; 707/770; 600/141, 595; 310/334; 340/573.1; 341/20; 355/67; 358/1.12; 382/103
See application file for complete search history.

(56) References Cited

U.S. PATENT DOCUMENTS

| | | |
|---|---|---|
| 2005/0033515 A1 | 2/2005 | Bozzone |
| 2006/0071798 A1* | 4/2006 | Kiff et al. .................... 340/573.1 |
| 2006/0139600 A1* | 6/2006 | Jacobus Tinnemans et al. .............................. 355/67 |
| 2007/0244633 A1* | 10/2007 | Phillips et al. ................ 701/207 |
| 2008/0136292 A1* | 6/2008 | Thiesen ......................... 310/334 |
| 2008/0190202 A1 | 8/2008 | Kulach et al. |
| 2008/0255800 A1 | 10/2008 | Meriheina et al. |
| 2009/0168088 A1* | 7/2009 | Rosenblatt .................... 358/1.12 |
| 2010/0063779 A1 | 3/2010 | Schrock et al. |
| 2010/0117837 A1* | 5/2010 | Stirling et al. ............. 340/573.1 |
| 2010/0204616 A1* | 8/2010 | Shears et al. .................. 600/595 |
| 2010/0312547 A1* | 12/2010 | Van Os et al. ..................... 704/9 |
| 2011/0054836 A1 | 3/2011 | Foxlin |
| 2011/0117924 A1* | 5/2011 | Brunner et al. ............ 455/456.1 |
| 2011/0184241 A1* | 7/2011 | Zubiate et al. ................ 600/141 |
| 2011/0202278 A1* | 8/2011 | Caute et al. ..................... 702/14 |
| 2011/0215952 A1* | 9/2011 | Aria et al. ........................ 341/20 |
| 2011/0252057 A1* | 10/2011 | Huang et al. .................. 707/770 |
| 2011/0286631 A1* | 11/2011 | Wagner et al. ................ 382/103 |

OTHER PUBLICATIONS

Discovery Health, "The Nike + iPod Sensor", http://www.health.howstuffworks.com/wellness/diet-fitness/information/nike-ipod1.htm/printable, pp. 1-6, accessed Jul. 26, 2011.
Honeywell, "DRM 4000 Dead Reckoning Module", www.honeywell.com, pp. 1-4, article undated.
Popular Mechanics, "Dead-Reckoning Footwear", published May 1, 2011, p. 1.
Science Daily, "GPS Not Working? A Shoe Radar May Help You Find Your Way." http://www.sciencedaily.com/releases/2010/12/101201102557.htm, Dec. 2, 2010, pp. 1-2, accessed May 25, 2011.
Zhou et al., "A Low-Power Shoe-Embedded Radar for Aiding Pedestrian Inertial Navigation", IEEE Transactions on Microwave Theory and Techniques, vol. 58, No. 10, Oct. 2010, pp. 2521-2528.

* cited by examiner

*Primary Examiner* — James Trammell
*Assistant Examiner* — Sanjeev Malhotra
(74) *Attorney, Agent, or Firm* — Lando & Anastasi, LLP

(57) ABSTRACT

A positioning device includes a magnetometer configured to detect and provide heading information, a motion sensor configured to detect and provide motion information, a microcontroller coupled to the magnetometer and the motion sensor and configured to generate position data based on the heading information and the motion information, a transmitter coupled to the microcontroller and configured to wirelessly transmit a signal including the position data, and a piezoelectric power source configured to supply power to at least one of the microcontroller, the magnetometer, the motion sensor and the transmitter.

20 Claims, 5 Drawing Sheets

POSITIONING MODULE

BACKGROUND

The Global Positioning System (GPS) is a global navigation satellite system maintained by the United States government that provides continuous position and time information. The GPS includes an Earth-orbiting satellite constellation that broadcasts microwave signals. As is well known in the art, compatible GPS receiving devices receive and process the data in the signals to determine the three-dimensional position (latitude, longitude, and elevation) of the receiver.

GPS receivers typically only operate reliably outdoors where there is a clear line of sight to at least three or four of the satellites. The receiver cannot update the position information using GPS alone when trees, buildings, and other obstructions block, scatter or significantly attenuate the microwave signals. This is a concern for soldiers and others who require accurate location information in environments where GPS signals may not be available, such as in forests, caves, or mountainous regions. Techniques for augmenting GPS exist; however, these techniques typically are designed to correct for errors in the GPS signal and require another system to transmit additional position information to the receiver.

SUMMARY

Aspects and embodiments are directed to positioning systems and methods that supplement GPS-based positioning devices. In at least one embodiment, a positioning module includes a motion sensor, a magnetometer, a transmitter, a microprocessor and a piezoelectric power source. At least a portion of the positioning module is powered by the piezoelectric power source, which generates power when a mechanical force is applied to it. In one embodiment, the positioning module is configured to be attached to an article of footwear, for example, a shoe or boot. The positioning module detects the magnitude and the direction (e.g., the compass heading) of any movement of the positioning module and wirelessly transmits, via the transmitter, motion information to the GPS-based positioning device. The GPS-based positioning device may use the motion information to determine the position of the positioning module when GPS signals are unavailable, for example, by calculating a change in position of the positioning module from the last-known GPS position.

According to one aspect, a positioning device includes a magnetometer configured to detect and provide heading information, a motion sensor configured to detect and provide motion information, a microcontroller coupled to the magnetometer and the motion sensor and configured to generate position data based on the heading information and the motion information, a transmitter coupled to the microcontroller and configured to wirelessly transmit a signal including the position data, and a piezoelectric power source configured to supply power to the microcontroller, the magnetometer, the motion sensor and/or the transmitter.

In one embodiment, the motion sensor may be configured to detect motion of the positioning device along at least two orthogonal axes with respect to an external reference point. In another embodiment, the motion sensor may include an accelerometer and/or an inertial measurement unit (IMU). In yet another embodiment, the IMU may be implemented in a microelectricalmechanical (MEMS) device.

In another embodiment, the positioning device may include an integrated housing. The microcontroller, the magnetometer, the motion sensor, the transmitter, and/or the piezoelectric power source may be disposed within the integrated housing.

In another embodiment, the integrated housing may be configured to be coupled to an article of footwear. In another embodiment, the piezoelectric power source may be configured to accumulate an electrical charge in response to a mechanical force to be applied to the piezoelectric power source through the article of footwear.

In another embodiment, the positioning device may be configured to be wirelessly coupled to a navigation system, and wherein the transmitter is configured to wirelessly transmit the signal including the position data to the navigation system.

In another embodiment, the navigation system may be a Global Positioning System (GPS) navigation system. The navigation system may be configured to use the position data to provide supplemental position information in a GPS-denied environment.

In another embodiment, the position data may include a unique identification number associated with the positioning device. In another embodiment, an external navigation system may be logically paired with the positioning device based on the unique identification number. The external navigation system may be configured to receive the position data.

According to one aspect, a method of determining a position of a positioning device includes providing electric power from a piezoelectric power source to a microcontroller, a magnetometer, a motion sensor, and/or a transmitter, detecting motion of the motion sensor, obtaining motion information using the motion sensor in response to detecting the motion of the motion sensor, obtaining heading information using the magnetometer in response to detecting the motion of the motion sensor, generating position information based on the heading information and the motion information using the microcontroller, and wirelessly transmitting a signal including the position information using the transmitter.

In one embodiment, generating the position information may include determining a quantity representing a change in geographic position with respect to a prior geographic position. In another embodiment, the quantity may include a distance traveled from the prior geographic position and/or a direction traveled from the prior geographic position.

In another embodiment, the method may include determining a geographic position based at least in part on the position information. In another embodiment, determining the geographic position may include calculating a current geographic position using the position information and a previously known geographic position.

In another embodiment, generating the position information may include providing a unique identification number associated with the positioning device. In another embodiment, the method may include logically pairing the positioning device with an external navigation system using the unique identification number.

In another embodiment, the piezoelectric power source may be coupled to an article of footwear. The method may include accumulating an electrical charge in response to a mechanical force to be applied to the piezoelectric power source via the article of footwear.

According to one aspect, a positioning device includes a piezoelectric power source, means coupled to the piezoelectric power source for determining a relative change in geographic position of the positioning device, and a transmitter coupled to the piezoelectric power source and configured to transmit a signal including data representing the relative change in geographic position.

In one embodiment, the positioning device may be included in an article of footwear. The piezoelectric power source may be configured to accumulate an electrical charge in response to a mechanical force to be applied to the positioning device via the article of footwear.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
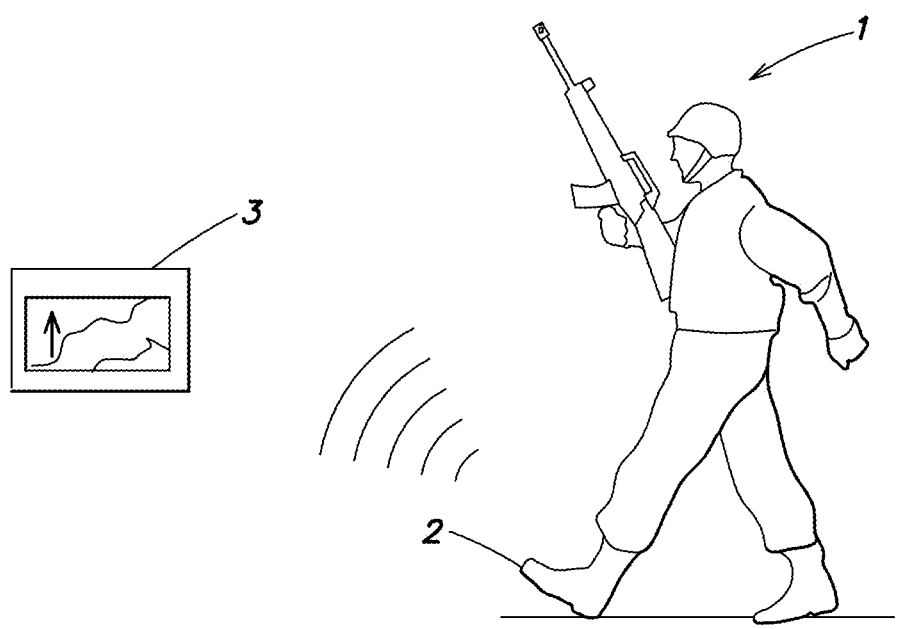
FIG. 1 is a schematic diagram of one example of a positioning system in accordance with aspects of the invention.

Current positioning technology relies heavily on GPS, which provides accurate location information worldwide. However, as discussed above, constant line-of-sight GPS signal reception from at least three and preferably at least four satellites in the GPS constellation is necessary to accurately determine current position. A person using a GPS receiver, such as a solider, may be moving through areas where GPS signals are obstructed by forests, buildings, tunnels, caves, mountains, and other objects (also referred to below as GPS-denied environments). Depending on the environment, the GPS signals may be denied for extended periods of time, during which accurate position information may be needed.

Existing technologies that supplement GPS-based positioning devices are costly, large, consume large amounts of power, and/or have large error rates. For example, an inertial measurement unit (IMU) measures forces caused by acceleration to determine how far the unit has moved. The current position is estimated by applying the distance moved to a previously known position. However, even very small errors in the IMU calculations can quickly accumulate to produce a large error in the estimated current position. Therefore it is necessary to supplement the IMU with other techniques to reduce the error rate.

One current technique, as described in the article "GPS Not Working? A Shoe Radar May Help You Find Your Way," published by ScienceDaily® on Dec. 2, 2010, uses a radar sensor that is attached to a shoe. The radar is used to determine the distance between the heel of the shoe and the ground. If the distance is constant over a period of time, then the shoe is presumed to be stationary, and any velocity-related errors are canceled. However, this technique does not correct for errors that accumulate while the shoe is in motion.

Another current technique is implemented in Nike+ products by Nike, Inc. of Beaverton, Oreg. The technique utilizes a piezoelectric sensor that detects when a person's foot is against the ground. The amount of ground contact time is used to determine the person's speed; that is, the faster the person is moving, the less time his or her foot is on the ground, and vice versa. The sensor wirelessly transmits the speed information to an external device. However, this technique cannot determine direction of motion.

Aspects and embodiments are directed to a positioning module configured to detect movement of the positioning module, and generate motion information including the magnitude and direction of motion of the positioning module. The positioning module is configured to be attached to a shoe or boot worn by a soldier, fire fighter, law enforcement officer, rescuer, or other person. Examples of types of detectable movement include, for example, running, walking, crawling, jumping, or swimming. Other motion may also be detected, for instance, where the individual carrying the positioning module is riding aboard a moving vehicle or watercraft, or parachuting from an aircraft.

According to one embodiment, and as discussed in further detail below, the positioning module includes a motion sensor, a magnetometer, a microprocessor, a transmitter, and a power source. The positioning module is powered by the power source, which, in at least one embodiment, includes a piezoelectric cell. The motion sensor and magnetometer are used to detect and measure the magnitude and direction of motion. The positioning module is configured to provide, based on the motion, supplemental position data to a positioning device, such as a GPS-based navigation unit, so that the positioning device may, for example, determine a current position of the positioning module in a GPS-denied environment using the supplemental position data. In one embodiment, the supplemental position data is wirelessly transmitted from the positioning module to the positioning device using the transmitter.

Embodiments of the invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a schematic diagram illustrating one exemplary use of a positioning system according to one embodiment. The system includes a positioning module (not shown) worn or carried by an individual 1 that may be, for example, attached to an article of footwear 2 such as a shoe or boot. As described in further detail below, according to at least one embodiment, the positioning module is a self-powered device that detects motion of the individual 1, including the distance and direction of travel over a period of time. The positioning module includes a transmitter for transmitting the distance and heading information to a positioning device 3, which may be, for example, a hand-held or helmet-mounted navigation device adapted to receive and process the motion information.

Figure 2:
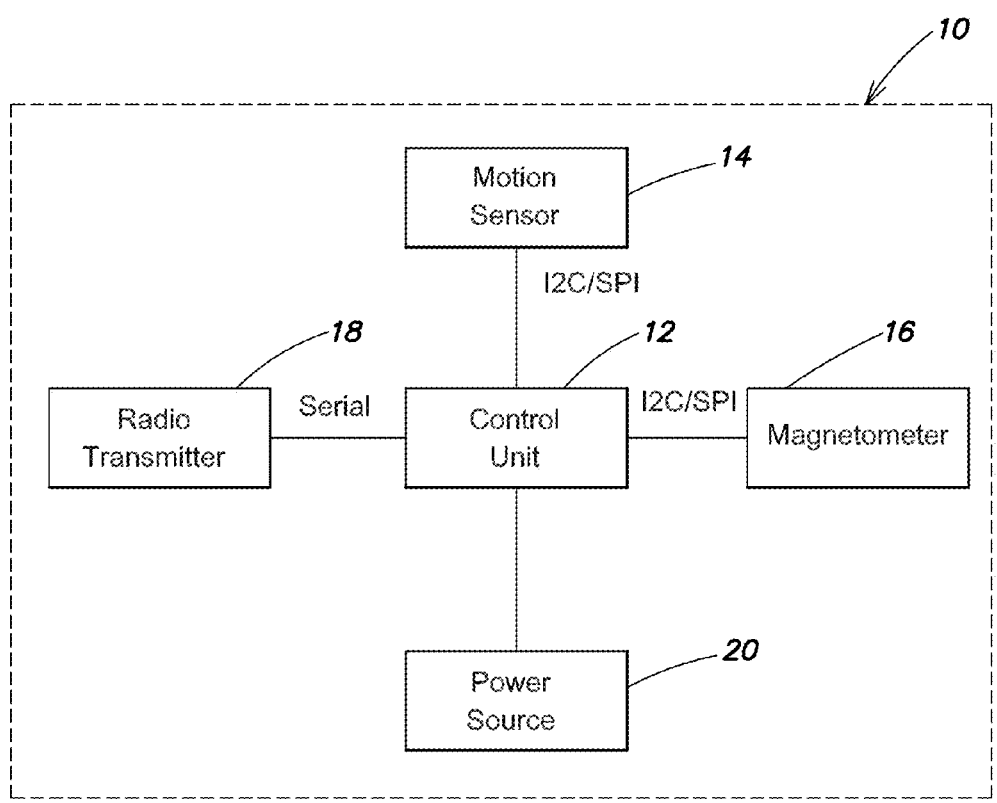
FIG. 2 is a schematic block diagram of one example of a positioning module in accordance with aspects of the invention.

FIG. 2 is a schematic block diagram of a positioning module 10 according to one embodiment. The positioning module 10 includes a control unit 12, a motion sensor 14, a magnetometer 16, a transmitter 18, and a power source 20. In one embodiment, the control unit 12 is coupled to the motion sensor 14 and/or the magnetometer 16 with an I2C or SPI serial data bus. The control unit 12 includes a microprocessor or other computing device that is configured to receive motion information from the motion sensor 14, heading information from the magnetometer 16, and power from the power source 20.

In one embodiment, the power source 20 includes a piezoelectric cell. The piezoelectric cell generates an electrical charge when a mechanical force is applied to the cell. In one embodiment, the piezoelectric cell is attached to the heel portion of the article of footwear 2 such that the cell is compressed each time the person wearing the article of footwear takes a step. The electrical charge is used to power components of the positioning module including, for example, the control unit 12, the motion sensor 14, the magnetometer 16, and/or the transmitter 18. Other types of power supplies, such as batteries, may be used; however, a piezoelectric cell, unlike a battery, is advantageous because the piezoelectric cell provides a supply of regenerative power while the positioning module 10 is in use. In another embodiment, the positioning module 10 operates at reduced power consumption levels during periods of motion inactivity to conserve power stored in the power source 20, for example, by turning off the transmitter 18.

According to a variety of examples, positioning module 10 is implemented as one or more hardware and/or software components. For example, the functions of the control unit 12 may be implemented as computer-executable programs running on one or more commercially available processors, such as processors manufactured by Texas Instruments, Intel, AMD, Sun, IBM, Motorola, Freescale and ARM Holdings. However, various embodiments may be implemented on any type of processor, field-programmable gate array, multiprocessor or controller, whether commercially available or specially manufactured, that is programmed to perform the functions discussed below. In some examples, the positioning module 10 may include computer-readable, non-transitory storage (not shown in FIG. 1) to store data. This storage may include, for example, a relatively high performance, volatile, random access memory such as dynamic random access memory (DRAM), static memory (SRAM) or synchronous DRAM. However, the storage may include any device for storing data, such as a non-volatile memory, with sufficient throughput and storage capacity to support the functions described herein.

In one embodiment, the motion sensor 14 includes an accelerometer. The motion sensor 14 may be configured to detect motion of the positioning module 10 in at least two dimensions, such as along two orthogonal axes with respect to an external reference point (e.g., a point on the ground). Accordingly, the acceleration of the positioning module 10, which when combined with a measurement of time during which motion occurs, is used by the control unit 12 to determine a distance traveled across the ground. The motion sensor 14 is powered by the power source 20 or another power source, for example, using a separate piezoelectric cell. In another embodiment, the motion sensor 14 includes a gyroscope or a MEMS-based internal measurement unit (IMU), which are other types of motion detection devices that can be used to determine the distance traveled by the positioning module 10.

In one embodiment, the magnetometer 16 includes a digital compass configured to generate heading information, which is sent the control unit 12. The heading information, when combined with the distance information generated by the motion sensor 14, is used by the control unit 12 to calculate motion information including the distance and direction that the positioning module 10 travels over a period of time.

According to one embodiment, the motion information is transmitted by the transmitter 18 to an external positioning device, such as the positioning device 3 described above with respect to FIG. 1. In one example, the transmitter 18 is compatible with the proprietary ANT™ wireless sensor network protocol by Dynastream Innoventions, Inc., of Cochrane, Alberta, Canada. In one embodiment, the broadcast range of the transmitter 18 is up to 100 meters, which in a typical application of the positioning module 10 is sufficient for transmitting the motion information from the positioning module 10 to the external positioning device, although other broadcast ranges may be used.

In one embodiment, the positioning device 3 is configured to use the motion information provided by the positioning module 10 to calculate the current position, in particular, where GPS signals are unavailable. The positioning device 3 may utilize existing technologies such as GPS, Global'naya Navigatsionnaya Sputnikovaya Sistema (Global Navigation Satellite System or GLONASS) (Russia), COMPASS (China), Galileo (European Union), cellular base stations, Wi-Fi™ access points, LORAN, and other terrestrial radio navigation stations. The motion information generated by the positioning module 10 supplements calculations performed by the positioning device 3. For example, the positioning device 3 may calculate a current position using GPS signals and without supplementary information when the GPS signals are available. However, the positioning device 3 may use sources of position information other than GPS, including the motion information, for example, to calculate the current position in a GPS-denied environment. In this instance, the positioning device 3 calculates the current position by applying the motion information received from the positioning module to any previously known current position. For example, if the last GPS-derived position is latitude +a.n° (i.e., geographical coordinates a.n degrees north), longitude −b.m° (i.e., b.m degrees west), and the motion information received from the positioning module indicates that the individual 1 has moved north by 0.x° and west by 0.y°, then the positioning device 3 will determine, in the absence of GPS signals, that the current position is latitude +(a.n+0.x)° and longitude −(b.m+0.y)°. Algorithms may be used to convert the motion information (e.g., distance and heading) into geographic coordinates based on how the positioning module is worn or carried (e.g., on a shoe, pant leg, sleeve, or helmet). In another example, the motion information received by the positioning device 3 from the positioning module 10 may be used in a non-GPS-denied environment to provide additional accuracy to the GPS-based position calculations (for instance, as a sanity check to validate the current position).

According to one embodiment, the motion information includes a unique identification number associated with the positioning module 10. The unique identification number may be used, for example, by the external positioning device to logically bind or pair with the positioning module 10 and/or to enable the external positioning device to discriminate among data received from other (e.g., multiple) positioning modules 10. For example, logically pairing the external positioning device with the positioning module 10 enables the external positioning device to associate any data received from the positioning module 10, including the motion information, with the positioning module (as opposed to another positioning module, for example, worn by a different individual). In another embodiment, the positioning module 10 includes an ICD API (application programming interface), which is used to integrate the positioning module with multiple external navigation or positioning devices.

As discussed above, the positioning module 10 can be configured to attach to an article of footwear or other clothing. In one embodiment, the positioning module 10 is encapsulated or enclosed in a housing to increase durability, protect the module from damage, and provide a structure for attaching the module to another object, such as the article of footwear. The positioning module 10 may be constructed using disposable, low-cost, and lightweight materials. Examples of such materials include Acrylonitrile Butadiene Styrene (ABS), Polyoxymethylene (POM), Polycarbonate/Acrylonitrile Butadiene Styrene (PC/ABS), and Polyetherimide (PEI).

Figure 3:
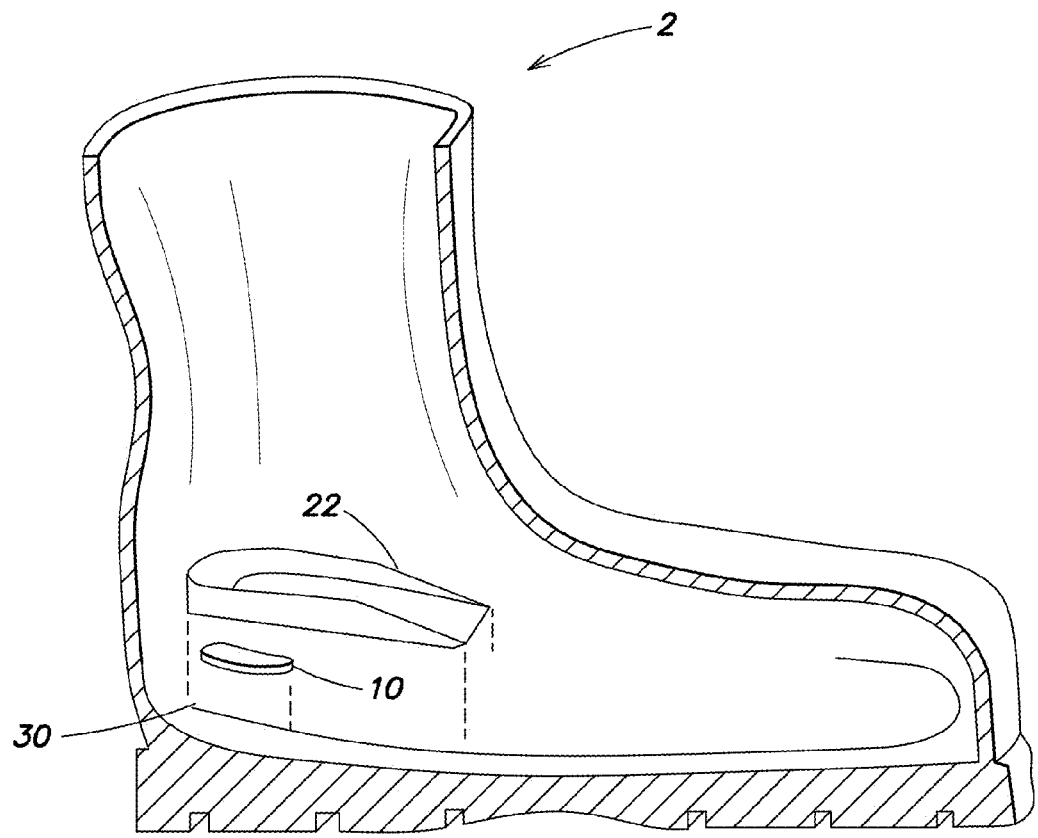
FIG. 3 is an exploded cut-away view of the positioning module of FIG. 2, an exemplary heel cup and an exemplary article of footwear in accordance with aspects of the invention.

FIG. 3 illustrates an exploded cut-away view of an article of footwear 2, such as a shoe or boot, with the positioning module 10 of FIG. 2 attached to a heel portion 30 of the footwear 2, according to one embodiment. In another embodiment, the positioning module 10 can be attached to the footwear 2 in another manner, for instance, embedded in or set upon the insole, along the tongue, the sidewall, or toe, so long as the movement of the individual wearing the footwear causes enough mechanical force against the piezoelectric cell, if any, in the power source 20 to generate a sufficient charge for powering the positioning module 10. If the power source 20 includes another type of power supply, such as a battery, then the positioning module 10 may be attached to any portion of the footwear, or to other articles of clothing or gear worn or carried by the individual 1.

Still referring to FIG. 3, a heel cup 22 may optionally be used to hold the positioning module 10 in a fixed location within the footwear 2, such as adjacent to or within the heel portion 30 of the insole of the footwear. The heel cup 22 is configured to fit securely within the footwear, for example, on top of the insole. The heel cup 22 helps ensure that the positioning module 10 does not move or become dislodged and/or that a substantially uniform force is applied across the upward facing surface of the module when the heel of the individual 1 applies a force downward against the heel cup 22 (e.g., due to walking, running or standing). The positioning module 10 may be placed, for example, within or beneath the heel cup 22.

Figure 4A:
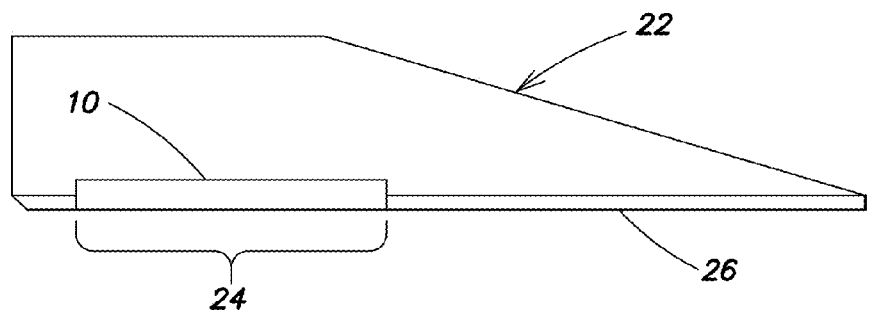
FIG. 4A is a cross-sectional elevation view of the heel cup of FIG. 3 along a cut line A-A'.
Figure 4B:
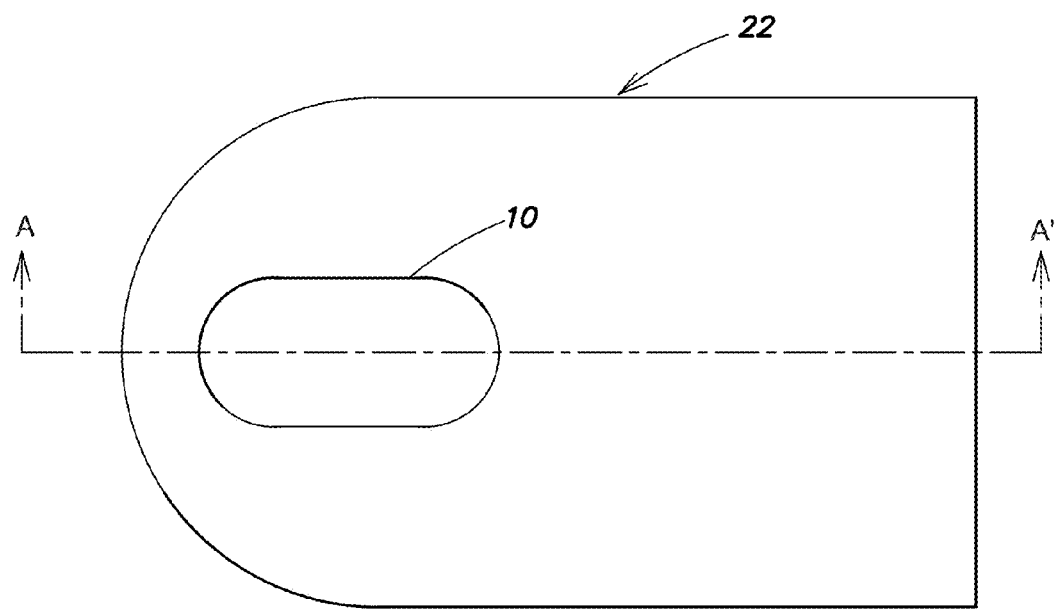
FIG. 4B is a top view of the heel cup shown in FIG. 4A.

FIG. 4A illustrates a cross-sectional elevation view of the heel cup 22 of FIG. 3 along a cut line A-A' showing the positioning module 10 inserted within the heel cup, according to one embodiment. FIG. 4B is a top view of the heel cup 22 and the positioning module 10. The positioning module 10 may, for example, be inserted within an opening 24 of the bottom portion of the heel cup 22, or, optionally, attached to the bottom surface 26 of the heel cup. The heel cup 22 may be fabricated with a pliable material adapted to transmit the downward pressure of a person's heel to the positioning module 10 so as to apply a mechanical force to a piezoelectric cell in the power source 20.

Figure 5:
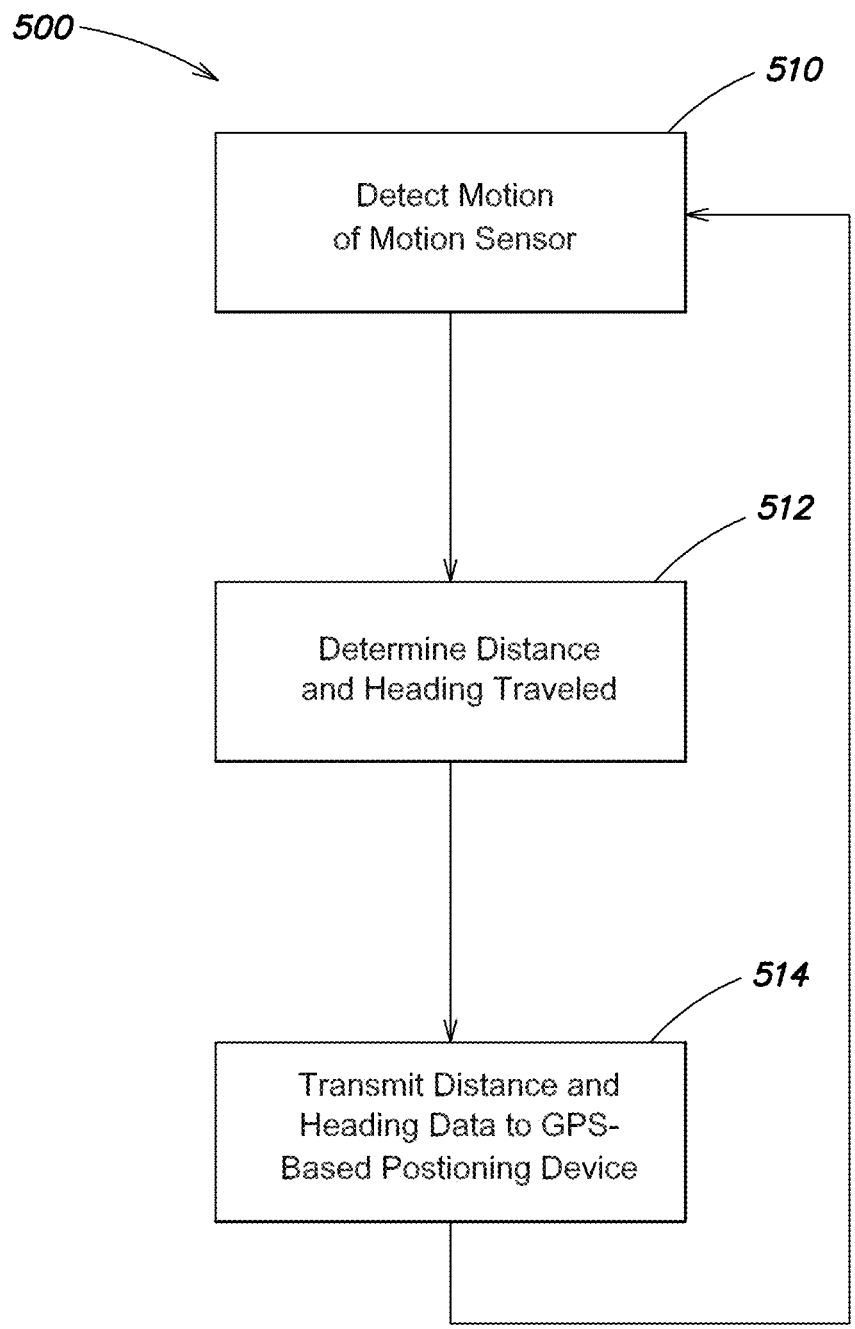
FIG. 5 is a flow diagram of a process for determining a position in accordance with aspects of the invention.

FIG. 5 is a flow diagram of a process for determining a position 500 according to one embodiment. Process may be implemented by the positioning module 10 described above. At step 510, the motion sensor detects movement of the positioning module 10. The motion is caused by any movement of the motion sensor in any direction (e.g., up, down, forward, backward, leftward, rightward). The motion sensor may be configured to detect a magnitude and a direction of motion, and to provide data to the control unit 12 including the magnitude and the direction of the detected motion. At step 512, the control unit 12 uses an algorithm to determine the distance traveled by the motion sensor (e.g., in meters) and the heading from the magnetometer 16 (e.g., in degrees with respect to magnetic north or true north).

At step 514, the distance and heading data are transmitted by the transmitter 18 to an external device configured to receive the distance and heading data, such as the positioning device 3 shown in FIG. 1. The distance and heading data may be used by the external device, for example, to determine the current position of the motion sensor and/or the external device, in particular, in a GPS-denied environment.

Process 500 may continue indefinitely by returning to step 510, for example, as long as the motion sensor 14 is powered up. In this manner, motion is continually detected so as to accurately track changes in the position of the motion sensor.

Thus aspects and embodiments may provide a lightweight, integrated positioning module that can be easily carried by a user, for example, accommodated within an article of footwear as discussed above. The positioning module may be compatible with another navigation device, such as a GPS-based device, to provide supplemental position/motion information to the GPS-based device, as discussed above, such that the user may be provided with accurate position information even in a GPS-denied environment. Using a piezoelectric power source allows embodiments of the positioning module to be self-powered without reliance on a battery, which may be particularly useful in remote locations and/or in circumstances when the weight the user can carry is limited, and therefore where access to new batteries or a battery charger may be difficult.

Having described above several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A positioning device for detecting position of a person, comprising:
    a magnetometer configured to detect heading of the person and provide heading information;
    a motion sensor configured to detect movement of the person and provide motion information;
    a microcontroller coupled to the magnetometer and the motion sensor and configured to generate position data based on the heading information and the motion information;
    a transmitter coupled to the microcontroller and configured to wirelessly transmit a signal including the position data;
    a piezoelectric power source configured to supply power to at least one of the microcontroller, the magnetometer, the motion sensor and the transmitter, wherein the positioning device is embedded into an article of footwear worn by the person; and
    a Global Positioning System (GPS) wirelessly coupled to the positioning device, configured to:
        receive the signal from the transmitter including the position data, and
        determine position in a GPS-denied environment responsive to receiving the position data from the transmitter.

2. The positioning device of claim 1, wherein the motion sensor is further configured to detect motion of the positioning device along at least two orthogonal axes with respect to an external reference point.

3. The positioning device of claim 2, wherein the motion sensor includes an accelerometer.

4. The positioning device of claim 2, wherein the motion sensor includes an inertial measurement unit (IMU).

5. The positioning device of claim 4, wherein the IMU is implemented in a microelectricalmechanical system (MEMS) device.

6. The positioning device of claim 1, further comprising an integrated housing, the microcontroller, the magnetometer, the motion sensor, the transmitter, and the piezoelectric power source disposed within the integrated housing.

7. The positioning device of claim 6, wherein the integrated housing is configured to be disposed within an insole of the article of footwear and is configured to hold the positioning device within the insole.

8. The positioning device of claim 7, wherein the piezoelectric power source is configured to accumulate an electrical charge in response to a mechanical force to be applied to the piezoelectric power source through the article of footwear.

9. The positioning device of claim 1, wherein the position data includes a unique identification number associated with the positioning device.

10. The positioning device of claim 9, wherein an external navigation system is logically paired with the positioning device based on the unique identification number, the external navigation system being configured to receive the position data.

11. A method of determining a position of a person using a positioning device, the method comprising:
    providing electric power from a piezoelectric power source to at least one of a microcontroller, a magnetometer, a motion sensor, and a transmitter, wherein the microcontroller, the magnetometer, the motion sensor, and the transmitter are embedded into an article of footwear worn by the person;
    detecting motion of the person using the motion sensor;
    obtaining motion information using the motion sensor in response to detecting the motion of the person;
    obtaining heading information of the person using the magnetometer in response to detecting the motion of the person;
    generating position information of the person based on the heading information and the motion information using the microcontroller; and
    wirelessly transmitting a signal including the position information using the transmitter; and
    determining a position for the person in a GPS-denied environment based on the position data generated by the microcontroller.

12. The method of claim 11, wherein generating the position information includes determining a quantity representing a change in geographic position of the person with respect to a prior geographic position of the person.

13. The method of claim 12, wherein the quantity includes at least one of a distance traveled by the person from the prior geographic position and a direction traveled by the person from the prior geographic position.

14. The method of claim 11, further comprising determining a geographic position of the person based at least in part on the position information.

15. The method of claim 14, wherein determining the geographic position includes calculating a current geographic position of the person using the position information and a previously known geographic position of the person.

16. The method of claim 11, wherein generating the position information further includes providing a unique identification number associated with the positioning device.

17. The method of claim 16, further comprising logically pairing the positioning device with an external navigation system using the unique identification number.

18. The method of claim 11, wherein the piezoelectric power source is coupled to an article of footwear, and wherein the method further comprises accumulating an electrical charge in response to a mechanical force to be applied to the piezoelectric power source via the article of footwear.

19. A positioning device for detecting position of a person, comprising:
    a piezoelectric power source embedded into an article of footwear worn by the person;
    means embedded into the article of footwear worn by the person coupled to the piezoelectric power source for determining a relative change in geographic position of the person by determining the relative change in geographic position of the positioning device;
    a transmitter coupled to the piezoelectric power source and configured to transmit a signal including data representing the relative change in geographic position; and
    means for determining a position of the person in a GPS-denied environment based on the signal including data representing the relative change in geographic position.

20. The positioning device of claim 19, wherein the positioning device is disposed within an insole of the article of footwear, and wherein the piezoelectric power source is configured to accumulate an electrical charge in response to a mechanical force to be applied to the positioning device via the article of footwear.

* * * * *